United States Patent
Lee et al.

(10) Patent No.: US 11,148,557 B2
(45) Date of Patent: Oct. 19, 2021

(54) DEVICE AND METHOD FOR AUTOMATICALLY RESTORING SEATBACK

(71) Applicants: Hyundai Motor Company, Seoul (KR); Kia Motors Corporation, Seoul (KR)

(72) Inventors: Hoon-Bok Lee, Gyeonggi-do (KR); Bong-Ku Kim, Seoul (KR); Sang-Hark Lee, Incheon (KR); Sang-Do Park, Gyeonggi-Do (KR); Hyun Ko, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/020,370

(22) Filed: Sep. 14, 2020

(65) Prior Publication Data

US 2021/0138934 A1     May 13, 2021

(30) Foreign Application Priority Data

Nov. 13, 2019   (KR) ........................ 10-2019-0145334

(51) Int. Cl.
  *B60R 21/0132*   (2006.01)
  *B60R 21/015*    (2006.01)
  (Continued)

(52) U.S. Cl.
  CPC .............. *B60N 2/12* (2013.01); *B60N 2/015* (2013.01); *B60N 2/0228* (2013.01);
  (Continued)

(58) Field of Classification Search
  CPC .......... B60N 2/0232; B60N 2002/0272; B60N 2/002; B60N 2/12; B60N 2/90; B60N 2/015
  See application file for complete search history.

(56) References Cited

U.S. PATENT DOCUMENTS 4,547,718 A   10/1985   Ratzel et al.
4,832,403 A   5/1989   Tomita
(Continued)

FOREIGN PATENT DOCUMENTS

JP   2015209193 A   11/2015
JP   2016-199243 A   12/2016
(Continued)

OTHER PUBLICATIONS

Search Report dated Feb. 15, 2021, in European Patent Appl'n No. 20204430.1, 8 pages.

*Primary Examiner* — Shin H Kim
(74) *Attorney, Agent, or Firm* — Mintz Levin Cohn Ferris Glovsky and Popeo, P.C.; Peter F. Corless (57) ABSTRACT

A device and a method for automatically restoring a seatback is provided in which a seatback is electrically deployed at a predetermined angle by being interlocked when a seat of a vehicle is moved to a predetermined position to facilitate a passenger to get into and out of the vehicle. The device includes a seat cushion, a seatback installed in the seat cushion to be adjustable in angle, a seat rail, and a seat track slidably installed in the seat rail. A seat position detection sensor detects a position of the seat track and a seat position detection member operates the seat position detection sensor. A seatback angle adjustment motor adjusts an angle of the seatback. When the seat position detection sensor detects that the seat track reaches a predetermined operating position, the seatback angle adjustment motor deploys the seatback.

18 Claims, 9 Drawing Sheets

(51) Int. Cl.
    *B60N 2/02*     (2006.01)
    *B60N 2/06*     (2006.01)
    *B60N 2/22*     (2006.01)
    *B60N 2/12*     (2006.01)
    *B60N 2/90*     (2018.01)
    *B60N 2/015*     (2006.01)

(52) U.S. Cl.
    CPC ............. *B60N 2/0232* (2013.01); *B60N 2/90* (2018.02); *B60N 2002/126* (2013.01)

(56) References Cited

U.S. PATENT DOCUMENTS

| | | | |
|---|---|---|---|
| 7,555,380 B2 | 6/2009 | Maue et al. | |
| 9,610,862 B2 * | 4/2017 | Bonk | B60N 2/0252 |
| 9,688,164 B2 * | 6/2017 | Vikstrom | B60N 2/0715 |
| 10,875,435 B1 * | 12/2020 | Battaglia | B60N 2/853 |
| 10,946,772 B2 | 3/2021 | Koh et al. | |
| 2005/0021207 A1 | 1/2005 | Endo et al. | |
| 2006/0208549 A1 | 9/2006 | Hancock et al. | |
| 2016/0101710 A1 * | 4/2016 | Bonk | B60N 2/0248 297/217.2 |
| 2019/0168771 A1 * | 6/2019 | Migneco | A61B 5/4064 |
| 2020/0139853 A1 * | 5/2020 | Nawrocki | B60N 2/20 |
| 2021/0078469 A1 * | 3/2021 | Humer | B60N 2/0232 |
| 2021/0138934 A1 * | 5/2021 | Lee | B60N 2/015 |

FOREIGN PATENT DOCUMENTS

| | | |
|---|---|---|
| JP | 2017-24602 A | 2/2017 |
| KR | 100785234 B1 | 12/2007 |
| KR | 10-2010-0138447 A | 12/2010 |
| KR | 20150106590 A | 9/2015 |
| KR | 101607206 B1 | 3/2016 |
| KR | 101669761 B1 | 10/2016 |
| KR | 101761064 B1 | 7/2017 |
| KR | 101934699 B1 | 1/2019 |
| WO | 2009035431 A1 | 3/2009 |

* cited by examiner

DEVICE AND METHOD FOR AUTOMATICALLY RESTORING SEATBACK

CROSS-REFERENCE(S) TO RELATED APPLICATIONS

This application claims priority to Korean Patent Application No. 10-2019-0145334, filed on Nov. 13, 2019, which is incorporated herein by reference in its entirety.

BACKGROUND

Field of Present Disclosure

The present disclosure relates to a device and a method for automatically restoring a seatback, in which a seatback is electrically deployed at a predetermined angle by being interlocked when a seat of a vehicle is moved to a predetermined position to allow a passenger to get into and out of the vehicle.

DESCRIPTION OF RELATED ART

In a vehicle, a walk-in device for adjusting a seat position and a folding of a seatback is applied to allow a passenger to get into and out of the vehicle more easily. For example, in a vehicle such as a sport utility vehicle (SUV), a second row seat slides and a seatback is folded to allow a passenger to get into and out of a third-row seat.

Conventionally, in the second row seat, sliding of the second row seat and a folding of the seatback are operated manually. Recently, power reclining, which electrically adjusts an angle of the seat, has also been applied to a second row seat or has been partially applied thereto. An operation of a walk-in device according to the related art will be described as follows.

Figure 1A:
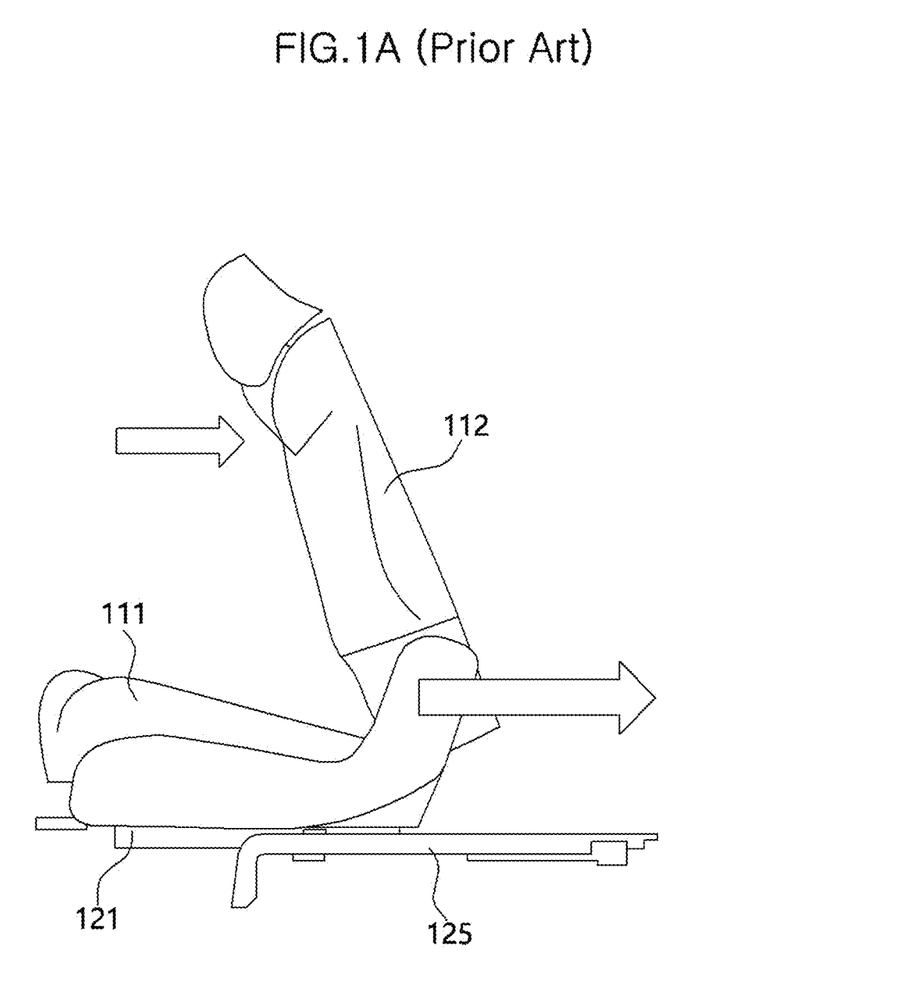
FIGS. 1A to 1C are schematic diagrams sequentially illustrating states in which a seat to which a walk-in device according to the related art is applied operates.
Figure 1B:
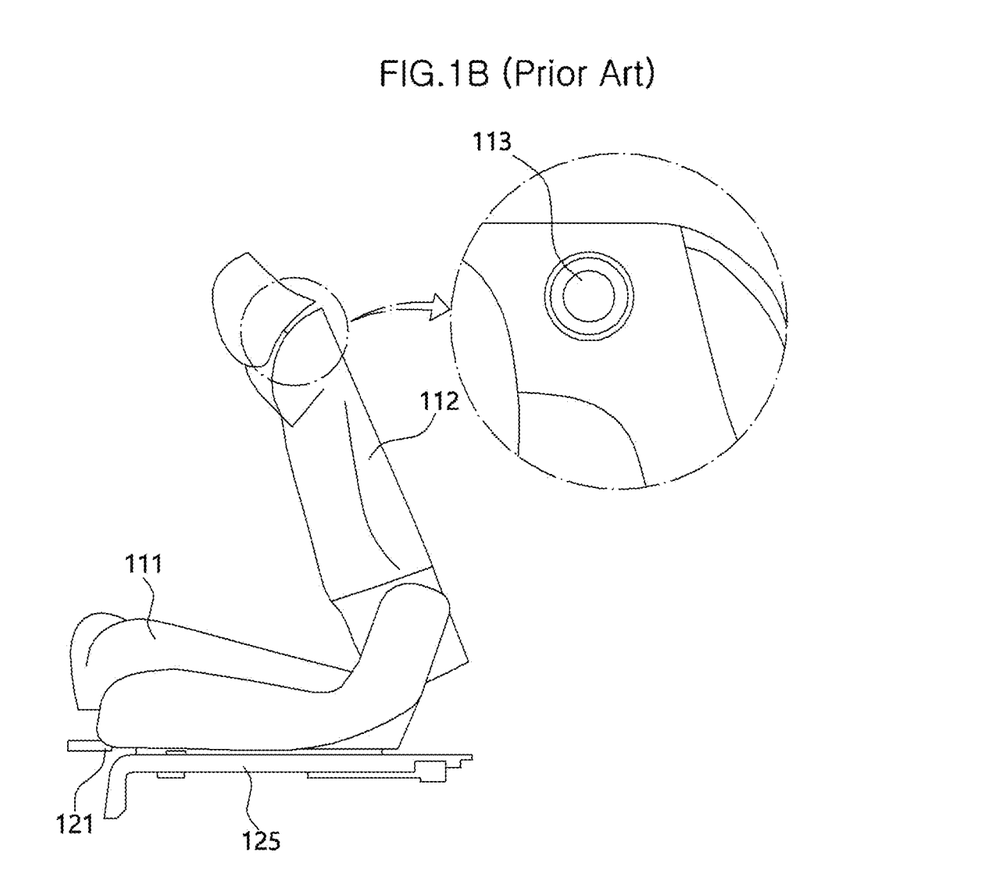
Figure 1C:
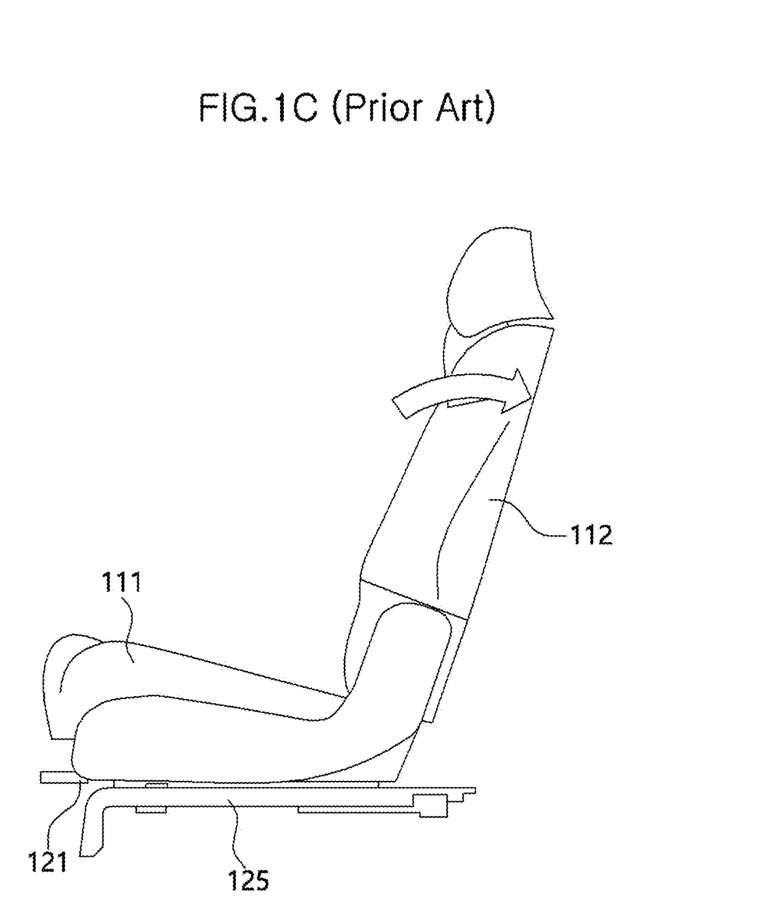

FIGS. 1A to 1C illustrate a process of restoring a second-row seat to an original position and an original state from a state in which the second-row seat is folded to be moved forward to assist a passenger when riding in a third-row seat. Thus, the sliding, folding, and unfolding of a seat is performed in the second-row seat.

In an initial state (see FIG. 1A), a seatback 112 is folded and a seat cushion 111 is moved forward. When the third-row seat is not use, the seat cushion 111 or the seatback 112 is moved to a rear side of the vehicle. When a seat track 121 in which the seat cushion 111 is installed is moved to a locking position along a seat rail 125, a walk-in switch 113 installed in the seatback 112 is operated (see FIG. 1B) to deploy the seatback 112 to complete a walk-in of the second row seat (see FIG. 1C). When an angle of the seatback 112 of the second-row seat is electrically adjusted, the seatback 112 is deployed and the angle of the seatback 112 is adjusted using the walk-in switch 113.

However, the walk-in device according to the related art requires separately adjusting the sliding of the second row seat and the reclining of the seatback 112 and an operation of deploying the seatback 112 after the second row seat slides thus requiring the operation to be performed in two stages. In addition, when the passenger gets into and out of the third-row seat and presses the walk-in switch 113 regardless of an intent of the passenger, the seatback 112 is folded or deployed increasing an injury risk. In other words, when the seatback 112 is folded regardless of the intent of the passenger, the passenger may fall forward, and, when the seatback 112 is deployed regardless of the intent of the passenger, the passenger is caught between the seatback 112 and a vehicle body thus increasing injury risk.

SUMMARY

The present disclosure provides a device and a method for automatically restoring a seatback, which detect a position of a seat to automatically restore a seatback at a predetermined angle when an angle of the seatback is electrically adjusted and the seat is moved to a predetermined position.

Other objects and advantages of the present disclosure may be understood by the following description and become apparent with reference to the exemplary embodiments of the present disclosure. Additionally, it is obvious to those skilled in the art to which the present disclosure pertains that the objects and advantages of the present disclosure can be realized by the means as claimed and combinations thereof.

In accordance with an exemplary embodiment of the present disclosure, a device for automatically restoring a seatback, which may include a seat cushion on which a passenger sits; a seatback installed in the seat cushion to be adjustable in angle; a seat rail installed in a floor panel of a vehicle in a length direction of the vehicle; a seat track having an upper portion, in which the seat cushion is mounted, and slidably installed in the seat rail; a seat position detection sensor installed in the seat rail or the seat track and configured to detect a position of the seat track; a seat position detection member installed in the seat rail or the seat track in which the sensor is not installed and configured to operate the seat position detection sensor; and a seatback angle adjustment motor configured to adjust an angle of the seatback in response to an output signal from the seat position detection sensor, wherein, when the seat position detection sensor detects that the seat track reaches a predetermined operating position, the seatback angle adjustment motor deploys the seatback.

When the seat track is moved backward along the seat rail to reach the predetermined operating position, the seatback angle adjustment motor may deploy the seatback. The seat position detection member may be installed to protrude from the seat track or the seat rail and may be a detection bracket which operates the seat position detection sensor when being adjacent thereto. The seat position detection sensor may be installed in the seat track, and the detection bracket may be installed in the seat rail.

A sensor bracket protruding from the seat track may be installed in the seat track, and the seat position detection sensor may be installed in the sensor bracket. The seat position detection sensor may be installed in the seat rail, and the detection bracket may be installed in the seat track. A sensor bracket protruding from the seat track may be installed in the seat rail, and the seat position detection sensor may be installed in the sensor bracket.

The predetermined operating position may be set to a position corresponding to 55% to 80% of a sliding section of the seat track from a front end of the sliding section. Alternatively, the predetermined operating position may be set to a position corresponding to 60% to 70% of the sliding section of the seat track from the front end of the sliding section. The predetermined operating position may be located at a front side in the vehicle rather than located at a front end of the seating section in which the seat track is fixed to the seat rail.

The device may further include a seat controller configured to determine that the seat track is located at the predetermined operating position when an output signal is input from the seat position detection sensor and operate the seatback angle adjustment motor to deploy the seatback at a predetermined angle. Even when an operating signal is input from a walk-in switch installed in the seatback while the seat is moved rearward, the seat controller may not operate the seatback angle adjustment motor. A reclining switch may be further provided at one side of the seat cushion to deploy the seatback at a predetermined angle before the seat reaches the predetermined operating position. The seat position detection sensor may be a sensor which operates in a non-contact manner.

Meanwhile, in accordance with another exemplary embodiment of the present disclosure, a method of automatically restoring a seatback may include moving a seat rearward of allowing a seat, which is pulled forward in a state in which a seatback is folded, to slide rearward; determining arrival at an operating position of determining whether the seat reaches an operating position which is set to start deployment of the seatback; in response to determining that the seat has reached the operating position, starting a motor operation of starting to drive the seatback angle adjustment motor which deploys the seatback; and deploying a seatback of driving the seatback angle adjustment motor to deploy the seatback at a predetermined angle.

In the determining of the arrival at the operating position, when the seat is determined as not reaching the operating position, the determining of the arrival at the operating position may be repeatedly performed. The predetermined operating position may be located at a front side in a vehicle rather than located at a front end of a seating section in which a seat track in which a seat cushion is installed is fixed to a seat rail. When an output signal is generated from a reclining switch installed at one side of the seat between the moving of the seat rearward and the determining of the arrival at the operating position, the starting of the motor operation and the deploying of the seatback may be performed.

BRIEF DESCRIPTION OF THE DRAWINGS

The objects, features and advantages of the present disclosure will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a device for automatically restoring a seatback according to the present disclosure will be described in detail with reference to the accompanying drawings.

Figure 2:
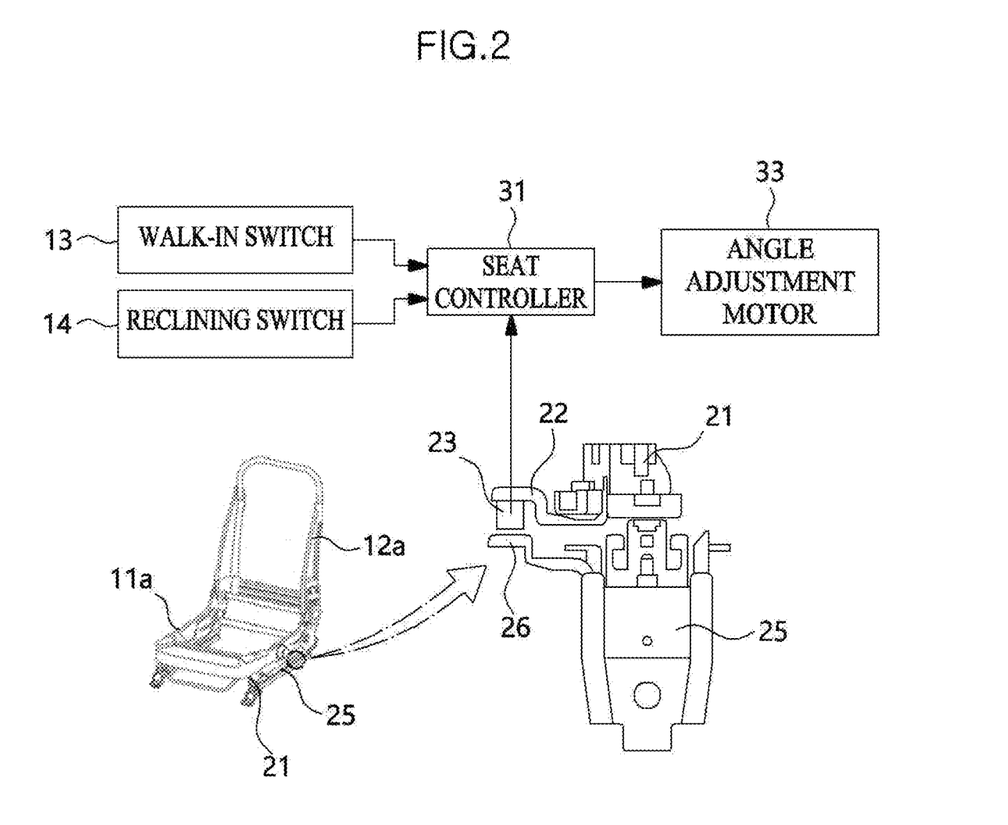
FIG. 2 is a schematic diagram illustrating a device for automatically restoring a seatback according to an exemplary embodiment of the present disclosure.

The device for automatically restoring a seatback according to the present disclosure may include a seat cushion 11 on which a passenger sits, a seatback 12 installed in the seat cushion 11 to be adjustable in angle, a seat rail 25 installed at a floor panel of a vehicle in a length direction of the vehicle, a seat track 21 having an upper portion on which the seat cushion 11 is mounted and slidably installed on the seat rail 25, a seat position detection sensor 23 configured to detect a position of the seat track 21 and installed in either of the seat rail 25 or the seat track 21, a seat position detection member 26 installed in the seat rail 25 or the seat track 21 in which the sensor is not installed and configured to operate the seat position detection sensor 23, and a seatback angle adjustment motor 33 configured to adjust an angle of the seatback 12 based on an output signal from the seat position detection sensor 23. When the seat position detection sensor 23 detects that the seat track 21 reaches a predetermined operating position S, the seatback angle adjustment motor 33 deploys the seatback 12.

A seat of the vehicle may include the seat cushion 11 on which the passenger sits and the seatback 12 installed in the seat cushion 11 and configured to support the back of the passenger. For convenience of the passenger, the seat may be moved (e.g., slid) in a front-rear direction of the vehicle, and an angle of the seatback 12 may be adjusted. The seatback 12 may be folded and unfolded from a folded state as necessary.

To move the seat in the front-rear direction of the vehicle, the seat rail 25 may be installed at the floor panel of the vehicle, and the seat track 21 on which the seat cushion 11 is mounted may be installed in the seat rail 25. The seat track 21 may slide on the seat rail 25 to adjust a position of the seat. It may be possible to electrically adjust an angle of the seatback 12. The seatback angle adjustment motor 33 may be installed in a portion at which the seatback 12 is connected to the seat cushion 11 to electrically adjust the angle of the seatback 12.

Meanwhile, for a passenger getting into and out of (e.g., entering and exiting) a rear seat of a vehicle, a walk-in device for moving a seat, which is located at a front side of the vehicle, forward and folding the seatback 12 is applied to some vehicles. For example, in a vehicle such as a sport utility vehicle (SUV), for a passenger getting into or out of a third-row seat, the walk-in device is configured to move a second-row seat forward and fold or deploy (unfolds) a seatback 12 of the second-row seat. In particular, in the present disclosure, when a seat, which is moved forward, is moved rearward in a vehicle to which a power reclining, in which an angle of a seatback is electrically adjusted, is applied, the seatback 12 may be deployed to an original position when the seat reaches a predetermined position.

Accordingly, the present invention includes the seat position detection sensor 23 installed in either the seat track 21 or the seat rail 25 and configured to detect a position of the seat, and the seat position detection member 26 installed in the remaining one among the seat track 21 and the seat rail 25 (e.g., in which the sensor is not installed) and configured to operate the seat position detection sensor 23. For example, as shown in FIG. 2, the seat position detection sensor 23 may be installed in the seat track 21 which slides in the front-rear direction of the vehicle, and the seat position detection member 26 may be mounted in the seat rail 25 which is fixed to the floor panel and on which the seat track 21 slides.

To mount the seat position detection sensor 23, a sensor bracket 22 may be installed to protrude from the seat track 21 in a width direction of the vehicle, and a detection bracket 26 that protrudes from the seat rail 25 may be applied as the seat position detection member 26. With the above configuration, as the seat track 21, which is moved forward further than a position at which the detection bracket 26 is installed, may be moved rearward, the seat position detection sensor 23 may be operated by the detection bracket 26, and thus a signal may be output from the seat position detection sensor 23.

When the signal is output from the seat position detection sensor 23, the signal may be input to a seat controller 31 configured to adjust a position and an attitude of the seat, and the seat controller 31 may be configured to operate the seatback angle adjustment motor 33 to restore the seatback 12 to the original angle. Meanwhile, although a configuration in which the seat position detection sensor 23 is installed in the seat track 21 has been described, the sensor bracket 22 may be installed in the seat rail 25, the seat position detection sensor 23 may be installed in the seat rail 25, and the detection bracket 26 may be installed in the seat track 21.

Particularly, the seat position detection sensor 23 may be a sensor configured to operate in a non-contact manner. When the seat position detection sensor 23 operates in a non-contact manner, abrasion and damage due to repetitive operations are prevented so that initial performance may be maintained. An operating position S in which the seat position detection sensor 23 operates may be between about 55% and about 80% of a section in which the seat track 21 slides on the seat rail 25 from a front end of the vehicle to a rear side. In particular, the operating position may be between about 60% and about 70% of the section.

Further, the operating position S may be located at the front side in the vehicle rather than located at a front end of a seating section L in which the seat track 21 is fixed to the seat rail 25. This is to allow the deployment of the seatback 12 to start before the seat track 21 is fixed to the seat rail 25 to rapidly complete the restoration of the seatback 12.

The seat rail 25 may be divided into a walk-in section W in which the seat track 21 is slidable but is not fixed, and the seating section L in which the seat track 21 slides to be fixed at a desired position. In the seat rail 25, the walk-in section W may be located in a front side, and the seating section L may be located behind the walk-in section W. In the present disclosure, the operating position S may be located at the front side in the vehicle rather than located at a front end of the seating section L.

Figure 3A:
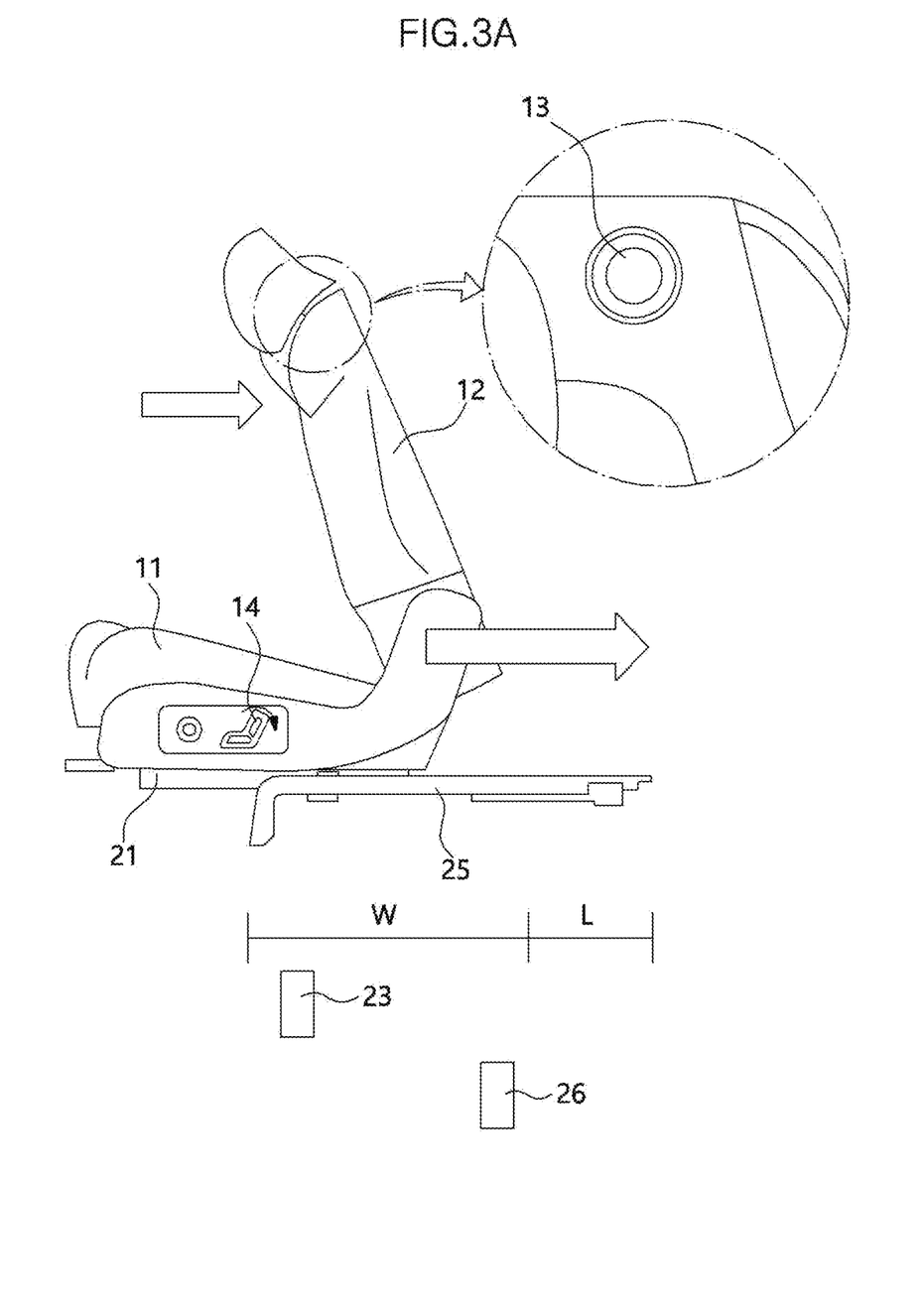
FIGS. 3A to 3C are schematic diagrams sequentially illustrating states in which a seat to which the device for automatically restoring a seatback according to an exemplary embodiment of the present disclosure is applied operates.
Figure 3B:
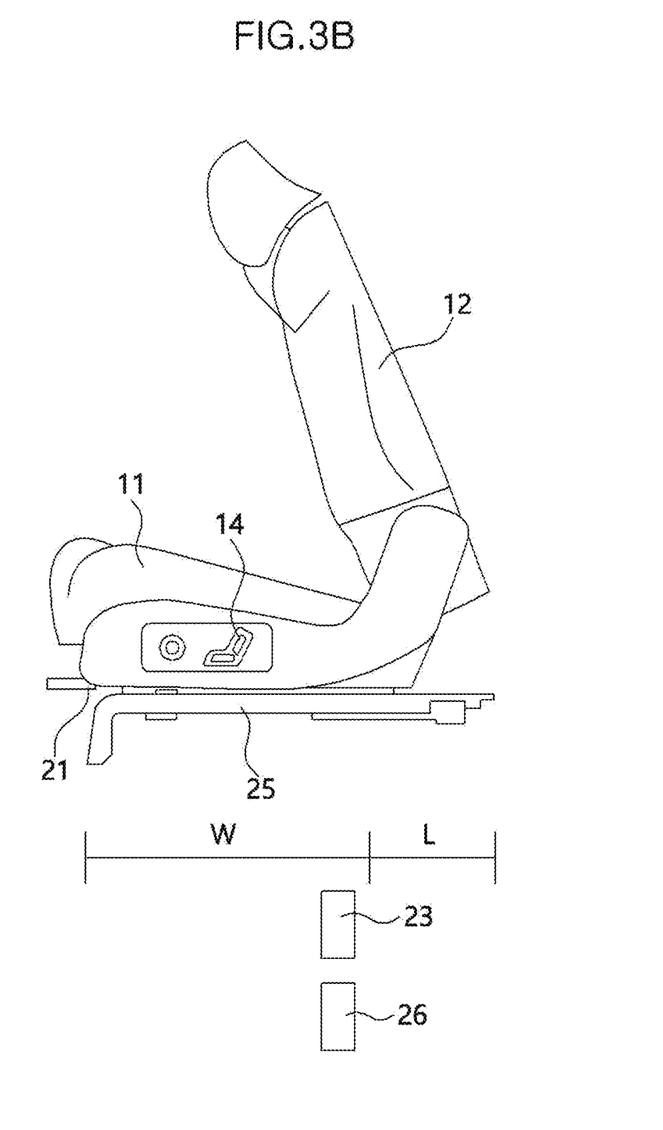
Figure 3C:
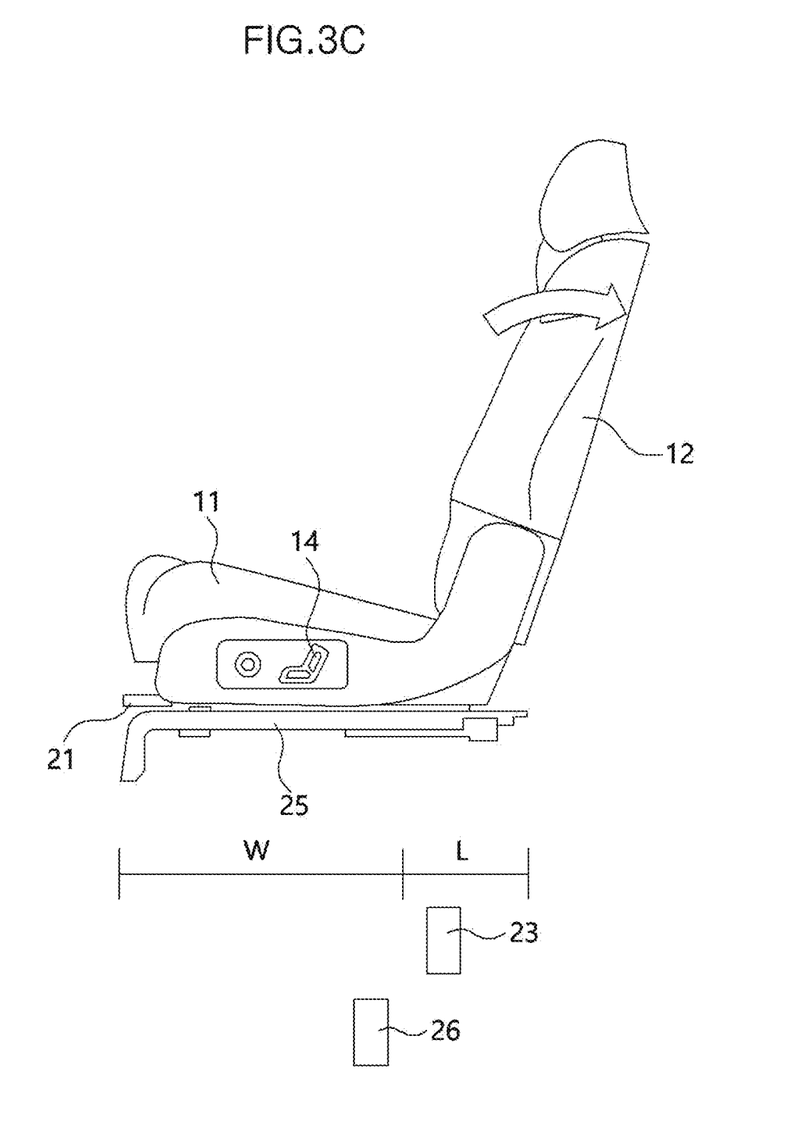
Figure 4:
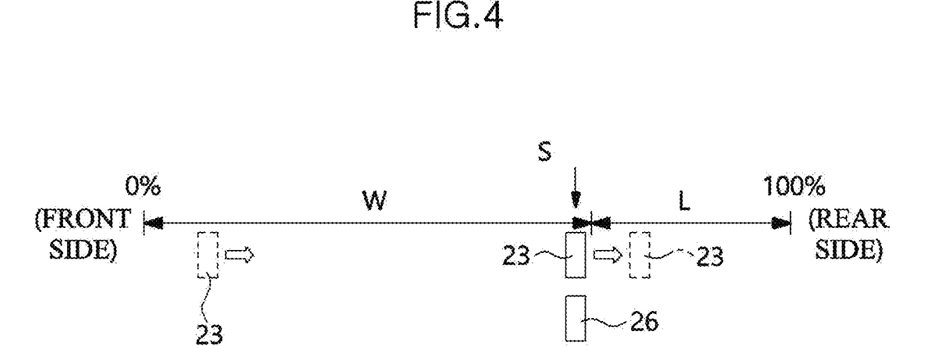
FIG. 4 is a schematic diagram for describing a state of the seat according to a length of a seat rail in the device for automatically restoring a seatback according to an exemplary embodiment of the present disclosure.

FIGS. 3A to 3C illustrate the walk-in section W and the seating section L, and positions of the seat position detection sensor 23 and the detection bracket 26 for each state. FIG. 4 illustrates the walk-in section W, the seating section L, and the operating position S, and a state in which the positions of the seat position detection sensor 23 and the detection bracket 26 overlap.

In response to signals input from sensors and switches which are installed in the seat, the seat controller 31 may be configured to operate a motor and an actuator, which are installed in the seat, to adjust a position and an attitude of the seat. When the seat reaches the operating position S and an output signal is input from the seat position detection sensor 23, the seat controller 31 may be configured to operate the seatback angle adjustment motor 33 to deploy the seatback 12 at a predetermined angle.

In addition, even when an operation signal is input from the walk-in switch 13 installed in the seatback 12, the seat controller 31 may be configured to determine whether to adjust the angle of the seatback 12 according to the state of the seat. For example, to allow the passenger to ride in the third-row seat, when the second-row seat slides forward and a walk-in for folding the seatback 12 begins, in response to a signal input from the walk-in switch 13, the seat controller 31 may be configured to operate the seatback angle adjustment motor 33 to fold the seatback 12. However, even when the walk-in switch 13 is pressed or engaged to generate the operation signal while the seat is restored, the seat controller 31 does not drive the seatback angle adjustment motor 33 by ignoring the operation signal of the walk-in switch 13.

Meanwhile, a reclining switch 14 for adjusting the angle of the seatback 12 at any position may be provided at one side of the seat, and preferably, at one side of the seat cushion 11. When there is a need to deploy the seatback 12 before the operating position S, the seatback 12 may be deployed using the reclining switch 14. Even before the seat reaches the operating position S while the seat is restored, when the reclining switch 14 is operated, and thus a signal is input to the seat controller 31 from the reclining switch 14, the seatback angle adjustment motor 33 may be operated to deploy the seatback 12.

An operation of the device for automatically restoring a seatback, which has the above-described configuration, according to the present disclosure will be described below. FIG. 3A illustrates a state in which the second-row seat is maximally moved forward and the seatback 12 is folded to allow the passenger to get into and out of the third-row seat.

When the seat is pushed rearward to restore the seat, which is moved forward, to an original state, the seat track 21 may be moved rearward on the seat rail 25. In an initial stage (e.g., the walk-in section W in FIG. 3A), the seat track 21 in which the seat is installed may be moved rearward. Thereafter, when the seat track 21 is continuously moved rearward to reach the operating position S, the seatback 12 may be restored to an original position by being interlocked with the seat track 21.

When the seat track 21 reaches the operating position S, an output value of the seat position detection sensor 23 may be transmitted to the seat controller 31. When the seat controller 31 determines that the seat track 21 reaches the operating position S, the seatback angle adjustment motor 33 may be operated to deploy the seatback 12. Therefore, even when only the operation of pushing the seat rearward is performed, when the seat reaches the operating position S, the seatback 12 may be deployed at an original angle without a separate operation.

In particular, since the operating position S is located at a front side of the vehicle rather than located at the front end of the seating section L, it may be possible to secure a space and safety for the passenger on the third-row seat. When the seat slides rearward and then the seatback 12 is deployed to an original position to allow another passenger to ride in the second-row seat in a state in which the passenger rides in the third-row seat, since the seat is moved to a rearmost position and then the seatback 12 is deployed at an original angle according to the related art, the seatback 12 presses against the knee of the passenger riding in the third-row seat thus increasing an injury risk or an uncomfortable riding state. However, according to the present disclosure, since the seatback 12 may be deployed in advance at the original angle in the operating position S to be restored to the original state, the seat may be stopped in the seating section L in advance to secure a space for the passenger riding in the third-row seat and prevent an injury.

Figure 5:
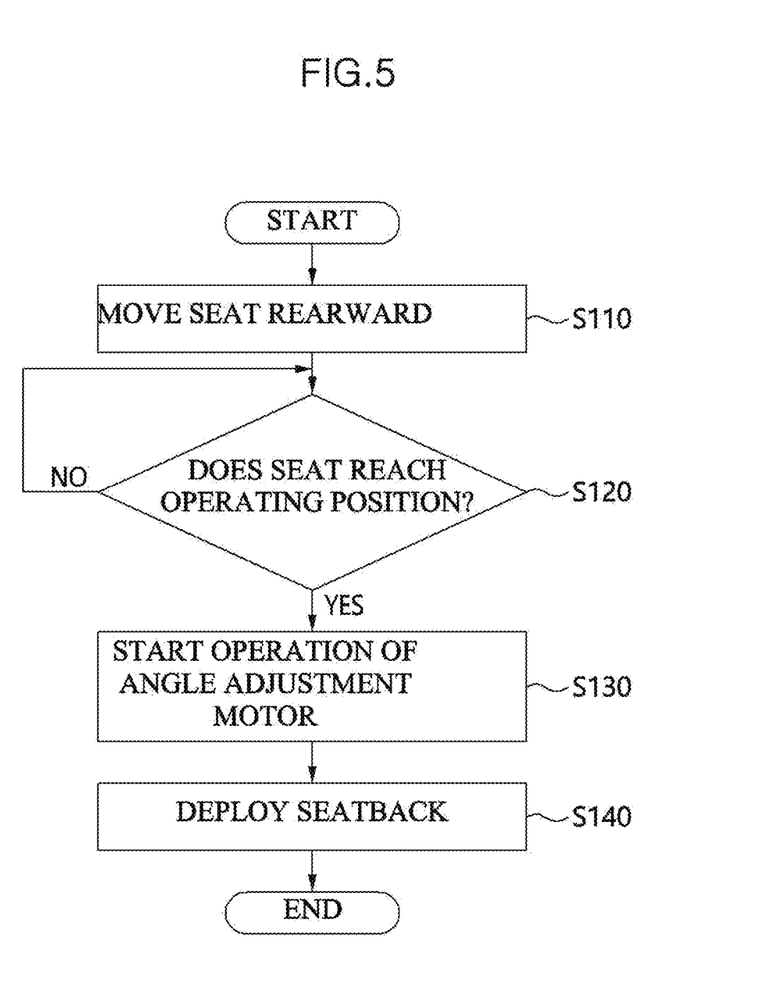
FIG. 5 is a flowchart illustrating a method of automatically restoring a seatback according to an exemplary embodiment of the present disclosure.

A method of automatically restoring a seatback according to the present disclosure will be described below with reference to FIG. 5. The method of automatically restoring a seatback according to the present disclosure is performed using the above-described device for automatically restoring a seatback.

In moving a seat rearward (S110), a seat pulled forward is moved rearward. For example, in a vehicle having a third-row seat, to assist a passenger, sitting in the third-row seat, in getting into and out of the vehicle, when the seatback 12 of the second-row seat is pulled forward in a state of being folded, after then, the second-row seat should be restored to an original position and the angle of the seatback 12 should be restored to an original state. Accordingly, in the moving of the seat rearward (S110), the seat may be moved rearward to move the seatback 12 to the seating section L which is the original position of the seatback 12.

In determining arrival at an operating position (S120), whether the seat reaches the operating position S which is set to start deployment of the seatback 12 may be determined. Whether the seat reaches the operating position S may be determined based on whether the above-described seat position detection sensor 23 outputs an output signal. In addition, when the seat is determined as not reaching the operating position S, the determining of the arrival at the operating position (S120) may be repeated.

In starting a motor operation (S130), the seatback angle adjustment motor 33 starts to be driven to deploy the seatback 12. In response to determining that the seat has reached the operating position S, to restore the angle of the seatback 12, the seat controller 31 may be configured to operate the seatback angle adjustment motor 33. The operating position S may be between about 55% and about 80% of a section in which the seat track 21 slides on the seat rail 25 from the front end of the vehicle to the rear side. In particular, the operating position S may be between about 60% and about 70% of the section.

In addition, the operating position S may be located at the front side in the vehicle rather than located at the front end of the seating section L in which the seat track 21 is fixed to the seat rail 25. In deploying a seatback (S140), the seatback angle adjustment motor 33 may be driven or operated to deploy the seatback 12 at a predetermined angle. When the seatback angle adjustment motor 33 is operated, the seatback 12 may be deployed in an erection direction, and the seatback angle adjustment motor 33 may be rotated to a predetermined angle to restore the seatback 12.

Meanwhile, when an output signal is generated from the reclining switch 14 installed at one side of the seat between the moving of the seat rearward (S110) and the determining of the arrival at the operating position (S120), the determining of the arrival at the operating position (S120) may not be performed, and the starting of the motor operation (S130) and the deploying of the seatback (S140) may be performed.

This is because the seat needs to deploy the seatback 12 before the operating position S so that the seat is operated by the user. Thus, when the reclining switch 14 is operated while the seat is moved rearward to be restored to an original position, the starting of the motor operation (S130) and the deploying of the seatback (S140) may be performed regardless of whether the seat reaches the operating position S to thus deploy the seatback 12.

In accordance with a device for automatically restoring a seatback according to the present disclosure, which has the above configuration, when a seat is moved to a predetermined position in a case in which an angle of a seatback is electrically adjusted, the seatback may be automatically deployed by being interlocked with a position of the seat. Even when only an operation of allowing the seat to slide rearward is performed, the seatback may be automatically restored to an original position and thus, a state of the seat may be restored in one operation (e.g., a one-step operation).

While the present disclosure has been described with respect to the exemplary embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

What is claimed is:

1. A device for automatically restoring a seatback, comprising:
   a seat cushion;
   a seatback installed in the seat cushion to be adjustable in angle;
   a seat rail installed in a floor panel of a vehicle in a length direction of the vehicle;
   a seat track having an upper portion, in which the seat cushion is mounted, and slidably installed in the seat rail;
   a seat position detection sensor installed in either the seat rail or the seat track and configured to detect a position of the seat track;

a seat position detection member installed in either the seat rail or the seat track in which the seat position detection sensor is not installed and configured to operate the seat position detection sensor; and a seatback angle adjustment motor configured to adjust an angle of the seatback in response to an output signal from the seat position detection sensor, wherein, in response to the seat position detection sensor detecting that the seat track has reached a predetermined operating position, the seatback angle adjustment motor deploys the seatback.

2. The device of claim 1, wherein, when the seat track is moved backward along the seat rail to reach the predetermined operating position, the seatback angle adjustment motor deploys the seatback.

3. The device of claim 1, wherein the seat position detection member is installed to protrude from the seat track or the seat rail and is a detection bracket which operates the seat position detection sensor when being adjacent thereto.

4. The device of claim 3, wherein the seat position detection sensor is installed in the seat track and the detection bracket is installed in the seat rail.

5. The device of claim 4, wherein a sensor bracket protruding from the seat track is installed in the seat track, and the seat position detection sensor is installed in the sensor bracket.

6. The device of claim 3, wherein the seat position detection sensor is installed in the seat rail; and the detection bracket is installed in the seat track.

7. The device of claim 6, wherein a sensor bracket protruding from the seat track is installed in the seat rail, and the seat position detection sensor is installed in the sensor bracket.

8. The device of claim 1, wherein the predetermined operating position is set to a position corresponding to 55% to 80% of a sliding section of the seat track from a front end of the sliding section.

9. The device of claim 8, wherein the predetermined operating position is set to a position corresponding to 60% to 70% of the sliding section of the seat track from the front end of the sliding section.

10. The device of claim 1, wherein the predetermined operating position is located at a front side of the vehicle rather than located at a front end of the seating section in which the seat track is fixed to the seat rail.

11. The device of claim 1, further comprising:
a seat controller configured to determine that the seat track is located at the predetermined operating position when an output signal is input from the seat position detection sensor and operate the seatback angle adjustment motor to deploy the seatback at a predetermined angle.

12. The device of claim 11, wherein, even when an operating signal is input from a walk-in switch installed in the seatback while the seat is moved rearward, the seat controller does not operate the seatback angle adjustment motor.

13. The device of claim 1, wherein a reclining switch is further provided at one side of the seat cushion to deploy the seatback at a predetermined angle before the seat reaches the predetermined operating position.

14. The device of claim 1, wherein the seat position detection sensor is a sensor configured to operate in a non-contact manner.

15. A method of automatically restoring a seatback, comprising:
moving a seat rearward of allowing a seat, which is pulled forward in a state in which a seatback is folded, to slide rearward;
determining arrival of the seat at an operating position, wherein the operating position which is set to start deployment of the seatback;
in response to determine that the seat has reached the operating position, starting a motor operation of starting to drive the seatback angle adjustment motor to deploy the seatback; and
deploying a seatback of driving the seatback angle adjustment motor to deploy the seatback at a predetermined angle.

16. The method of claim 15, wherein, in the determining of the arrival at the operating position, in response to determining that the seat has not reach the operating position, the determining of the arrival at the operating position is repeated.

17. The method of claim 15, wherein the predetermined operating position is located at a front side in a vehicle rather than located at a front end of a seating section in which a seat track, in which a seat cushion is installed, is fixed to a seat rail.

18. The method of claim 15, wherein, when an output signal is generated from a reclining switch installed at one side of the seat between the moving of the seat rearward and the determining of the arrival at the operating position, the starting of the motor operation and the deploying of the seatback are performed.

* * * * *